United States Patent
Zimmermann

(10) Patent No.: US 9,545,892 B2
(45) Date of Patent: Jan. 17, 2017

(54) SIDE BOLSTER ASSEMBLY HAVING AN AIRBAG

(71) Applicant: Lear Corporation, Southfield, MI (US)

(72) Inventor: Matthias Zimmermann, Munich (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 14/982,352

(22) Filed: Dec. 29, 2015

(65) Prior Publication Data

US 2016/0244018 A1 Aug. 25, 2016

(30) Foreign Application Priority Data

Feb. 25, 2015 (DE) .................. 10 2015 203 364

(51) Int. Cl.
| | | |
|---|---|---|
| *B60R 21/207* | (2006.01) | |
| *B60N 2/58* | (2006.01) | |
| *B60N 2/44* | (2006.01) | |

(52) U.S. Cl.
CPC ............ *B60R 21/207* (2013.01); *B60N 2/449* (2013.01); *B60N 2/58* (2013.01); *B60N 2002/5808* (2013.01); *B60R 2021/2076* (2013.01); *B60R 2021/2078* (2013.01)

(58) Field of Classification Search
CPC ..................... B60R 21/207; B60R 2021/2078; B60N 2/58; B60N 2002/5808
See application file for complete search history.

(56) References Cited

U.S. PATENT DOCUMENTS

| | | | | |
|---|---|---|---|---|
| 5,651,582 A * | 7/1997 | Nakano | ................. | B60R 21/207 280/730.2 |
| 5,816,610 A * | 10/1998 | Higashiura | .............. | B60N 2/58 280/728.3 |
| 5,826,938 A * | 10/1998 | Yanase | .................. | B60R 21/207 280/728.3 |
| 5,893,579 A * | 4/1999 | Kimura | ................ | B60N 2/5825 280/728.3 |
| 6,045,151 A | 4/2000 | Wu | | |
| 6,089,594 A | 7/2000 | Hasegawa et al. | | |
| 6,450,528 B1 * | 9/2002 | Suezawa | ............... | B60R 21/207 280/730.2 |
| 7,322,597 B2 * | 1/2008 | Tracht | .................. | B60R 21/207 280/728.3 |
| 7,334,811 B2 * | 2/2008 | Tracht | .................. | B60R 21/207 280/728.3 |

(Continued)

FOREIGN PATENT DOCUMENTS

| | | |
|---|---|---|
| DE | 69932210 T2 | 5/2007 |
| DE | 102013200076 A1 | 7/2014 |

(Continued)

OTHER PUBLICATIONS

German Patent and Trademark Office, Office Action for the corresponding German Patent Application No. 10 2015 203 364.3 dated Oct. 1, 2015.

*Primary Examiner* — Drew Brown
(74) *Attorney, Agent, or Firm* — Brooks Kushman P.C.

(57) ABSTRACT

A side bolster assembly for mounting in a vehicle. The side bolster assembly may include a carrier that may have a pocket. The pocket may receive an airbag module that may have an inflatable airbag. A cushion may extend across the pocket. A guide member may guide the airbag around the cushion upon inflation.

20 Claims, 3 Drawing Sheets

(56) References Cited

U.S. PATENT DOCUMENTS

| | | | | |
|---|---|---|---|---|
| 7,341,275 | B2* | 3/2008 | Miyake | B60R 21/207 280/730.2 |
| 7,390,015 | B2* | 6/2008 | Tracht | B60R 21/207 280/730.2 |
| 7,393,005 | B2* | 7/2008 | Inazu | B60N 2/5825 280/728.2 |
| 7,695,064 | B2* | 4/2010 | Thomas | B60N 2/58 280/728.3 |
| 8,573,635 | B2* | 11/2013 | Festag | B60R 21/207 280/730.2 |
| 8,672,352 | B2* | 3/2014 | Tracht | B60R 21/207 280/728.2 |
| 8,833,852 | B2* | 9/2014 | Festag | B60R 21/207 280/728.3 |
| 9,067,558 | B2* | 6/2015 | Akiyama | B60R 21/207 280/728.3 |
| 9,283,914 | B2* | 3/2016 | Fujiwara | B60R 21/207 |

FOREIGN PATENT DOCUMENTS

| | | |
|---|---|---|
| DE | 102013204611 A1 | 9/2014 |
| EP | 2631126 A1 | 8/2013 |

* cited by examiner

SIDE BOLSTER ASSEMBLY HAVING AN AIRBAG

TECHNICAL FIELD

This disclosure relates to a side bolster assembly having an airbag that may be provided with a vehicle.

BACKGROUND

A vehicle seat having an inflatable airbag is disclosed in U.S. Pat. No. 6,045,151.

SUMMARY

In at least one embodiment, a side bolster assembly is provided. The side bolster assembly may include a carrier, a cushion, an airbag module, a trim cover, and a guide member. The carrier may have a first wall and a pocket that extends from the first wall. The cushion may be supported by the first wall and may extend across the pocket. The airbag module may be supported by the carrier and may be disposed in the pocket. The airbag module may have an inflatable airbag. The trim cover may cover at least a portion of the cushion and may have a deployment seam. The guide member may guide the airbag around the cushion upon inflation. The guide member may extend from the airbag module toward the deployment seam such that the guide member may be disposed between the first wall and the cushion.

In at least one embodiment, a side bolster assembly is provided. The side bolster assembly may include a carrier, a cushion, an airbag module, a trim cover, and a guide member. The carrier may have a pocket and a first wall that may define a pocket opening. The pocket may be at least partially defined by a first pocket wall and a second pocket wall that may extend from the first wall. The cushion may be supported by the first pocket wall and may extend across the pocket opening. The airbag module may be supported by the carrier and may be disposed in the pocket between the first pocket wall and the second pocket wall. The airbag module may have an inflatable airbag. The trim cover may cover at least a portion of the cushion and may have a deployment seam. The guide member may guide the airbag around the cushion such that the airbag does not deploy through the cushion upon inflation. The guide member may extend between the airbag module and the deployment seam such that the guide member may be disposed between the first wall and the cushion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
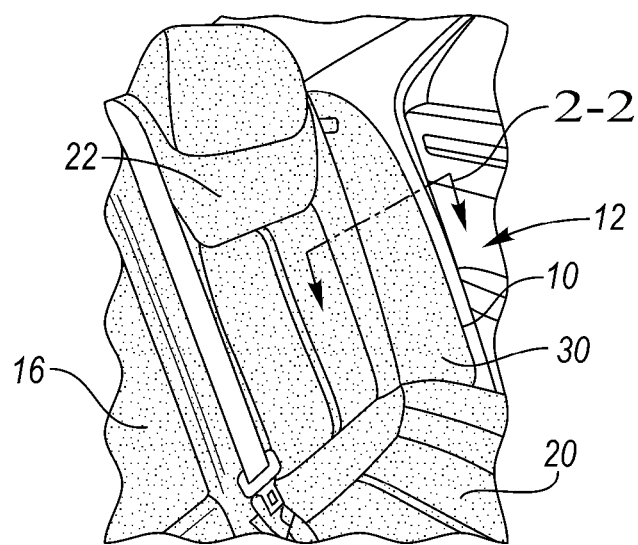
FIG. 1 is a fragmentary perspective view of a side bolster assembly mounted in a vehicle.

Referring to FIG. 1, an exemplary side bolster assembly 10 is shown. The side bolster assembly 10 may be provided with or configured for use with a vehicle 12, such as a motor vehicle like a car or truck.

Figure 2:
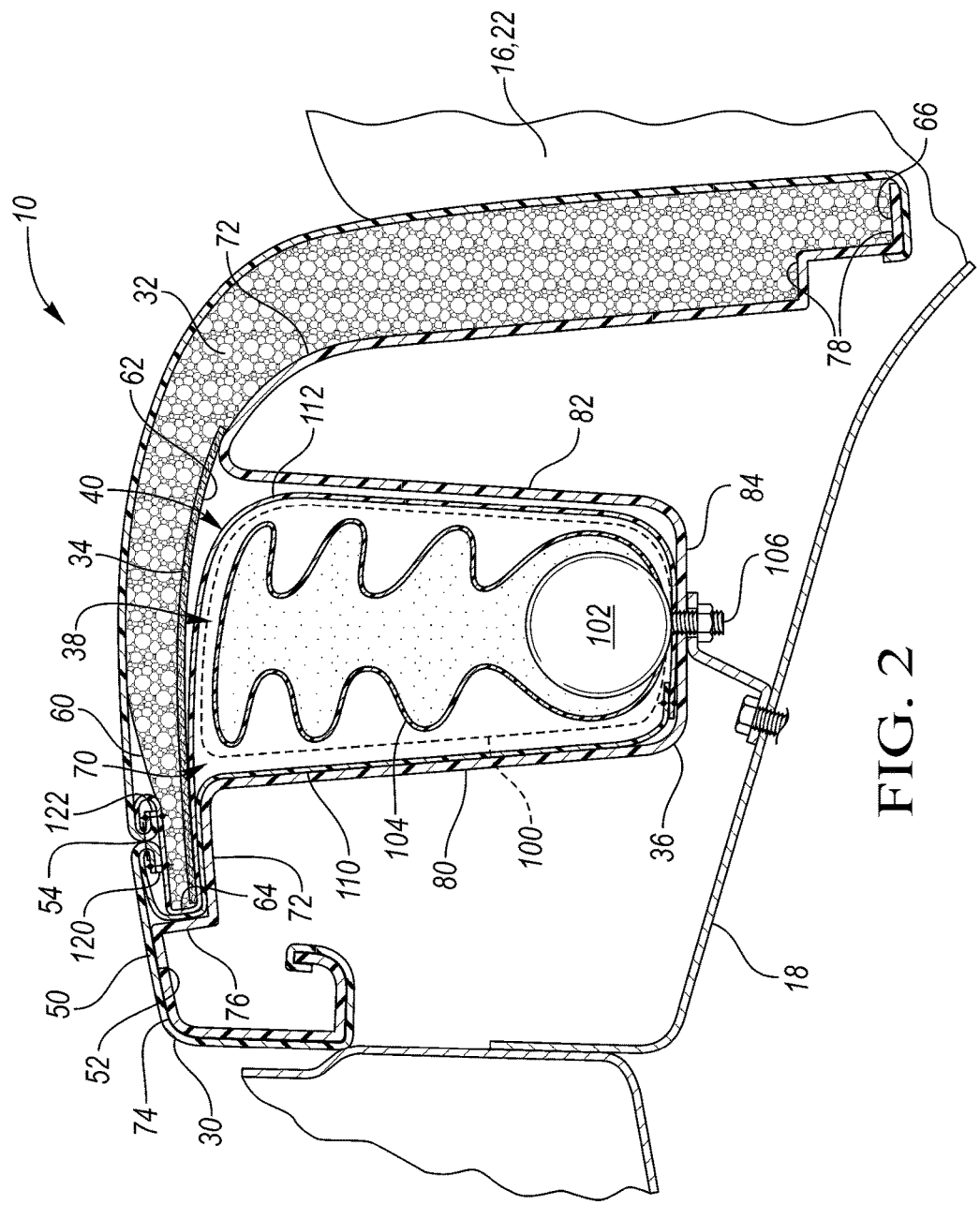
FIG. 2 is a section view of the side bolster assembly along section line 2-2.

The side bolster assembly 10 may be mountable in the vehicle 12 between a vehicle body 14 and a rear seat 16. For example, the side bolster assembly 10 may be mounted adjacent to the rear seat 16 such that an inboard side of the side bolster assembly 10 may face toward and may engage the seat back of the rear seat 16. The side bolster assembly 10 may not be provided with the rear seat 16 or seat back of the rear seat 16 in one or more embodiments. As is best shown in FIG. 2, the side bolster assembly 10 may be disposed proximate or may be mounted to an upright portion 18 of the vehicle body 14 that may at least partially define a wheel well. It is also contemplated that the side bolster assembly 10 may be mounted to the rear seat 16 in one or more embodiments.

The rear seat 16 may include a seat bottom 20 and a seat back 22. The seat bottom 20 may be adapted to be mounted to the vehicle 12 behind a front seat. The seat back 22 may be pivotally disposed on the seat bottom 20 such that the seat back 22 may pivot or rotate about an axis of rotation with respect to the side bolster assembly 10 and/or the seat bottom 20. As such, the side bolster assembly 10 may be separate from or completely detached from the rear seat 16 such that the seat back 22 may move or pivot with respect to the side bolster assembly 10.

Referring to FIG. 2, an example of a side bolster assembly 10 is shown in more detail. The side bolster assembly 10 may protrude forward of the seat back 22 and may be disposed between the seat back 22 and a lateral side or door of the vehicle 12. A pair of side bolster assemblies 10 may be provided with the vehicle 12 such that the side bolster assemblies may be disposed at opposite lateral sides of the seat back 22. One or more side bolster assemblies 10 may cooperate with the rear seat 16 to define a seating system. In at least one embodiment, the side bolster assembly 10 may include trim cover 30, a cushion 32, a cushion shield 34, a carrier 36, an airbag module 38, and a guide member 40.

The trim cover 30 may form an exterior surface 50 of at least a portion of the side bolster assembly 10. In addition, the trim cover 30 may engage and may at least partially cover or conceal the cushion 32. As is best shown in FIGS. 1 and 2, the trim cover 30 may extend across a front side of the side bolster assembly 10 that may be configured to face toward and/or or support a seat occupant. In addition, the trim cover 30 may extend around lateral sides of the side bolster assembly 10 in a rearward direction toward the vehicle body 14 and toward a back side of the side bolster assembly 10 that may be disposed opposite the front side as is best shown in FIG. 2. The trim cover 30 may be made of any suitable material, such as fabric, vinyl, leather, or combinations thereof. In addition, the trim cover 30 may be mounted on the side bolster assembly 10 in any suitable manner. For example, the trim cover 30 may have opposing ends that may be secured to the carrier 36 with one or more fasteners, such as a hook, clip, hook and loop fastener, or the like. The trim cover 30 may also include an interior surface 52 and a deployment seam 54.

The interior surface 52 may be disposed opposite the exterior surface 50. For example, the interior surface 52 may be disposed proximate the cushion 32 and may face toward and may engage the cushion 32.

The deployment seam 54 may sever in response to inflation of an airbag. The deployment seam 54 may be formed by stitching together two trim panels of the trim cover 30. The deployment seam 54 may extend in a generally vertical direction between the top and bottom of the side bolster assembly 10.

The cushion 32 may be configured to help support a seat occupant. The cushion 32 may be made of any suitable material, such as foam or a molded polymeric material. The cushion 32 may be supported by the carrier 36 as will be discussed in more detail below. The cushion 32 may have a first cushion surface 60, a second cushion surface 62, first cushion end surface 64, and a second cushion end surface 66.

The first cushion surface 60 may be disposed proximate the trim cover 30. For example, the first cushion surface 60 may face toward and may engage the interior surface 52 of the trim cover 30.

The second cushion surface 62 may be disposed opposite the first cushion surface 60. The second cushion surface 62 may be disposed proximate the carrier 36. For example, the second cushion surface 62 may face toward and may engage a first wall of the carrier 36 as will be discussed in more detail below.

The first cushion end surface 64 may extend from the first cushion surface 60 to the second cushion surface 62. In addition, the first cushion end surface 64 may be disposed proximate the guide member 40 as will be discussed in more detail below.

The second cushion end surface 66 may be disposed opposite the first cushion end surface 64. The second cushion end surface 66 may be disposed proximate the carrier 36 and may be disposed between the carrier 36 and the rear seat 16. For example, the second cushion end surface 66 may face toward and may engage a wall of the carrier 36 as will be discussed in more detail below.

The cushion shield 34, if provided, may help cover and/or protect the cushion 32 upon deployment of an airbag. The cushion shield 34 may be disposed on the second cushion surface 62 and may face toward the carrier 36 and the airbag module 38. The cushion shield 34 may be localized on the second cushion surface 62 and may extend continuously and/or completely across a pocket or pocket opening in the carrier 36 that may receive the airbag module 38. In at least one embodiment, the cushion shield 34 may extend from the first cushion end surface 64, over the airbag module 38 and across the pocket that receives the airbag module 38, and extend partially toward the second cushion end surface 66. The cushion shield 34 may be made of any suitable material that can flex with the cushion 32 upon airbag deployment and withstand forces associated with airbag deployment without damage such as tearing. For example, the cushion shield 34 may be a fleece, textile material, or polymeric material.

Figure 3:
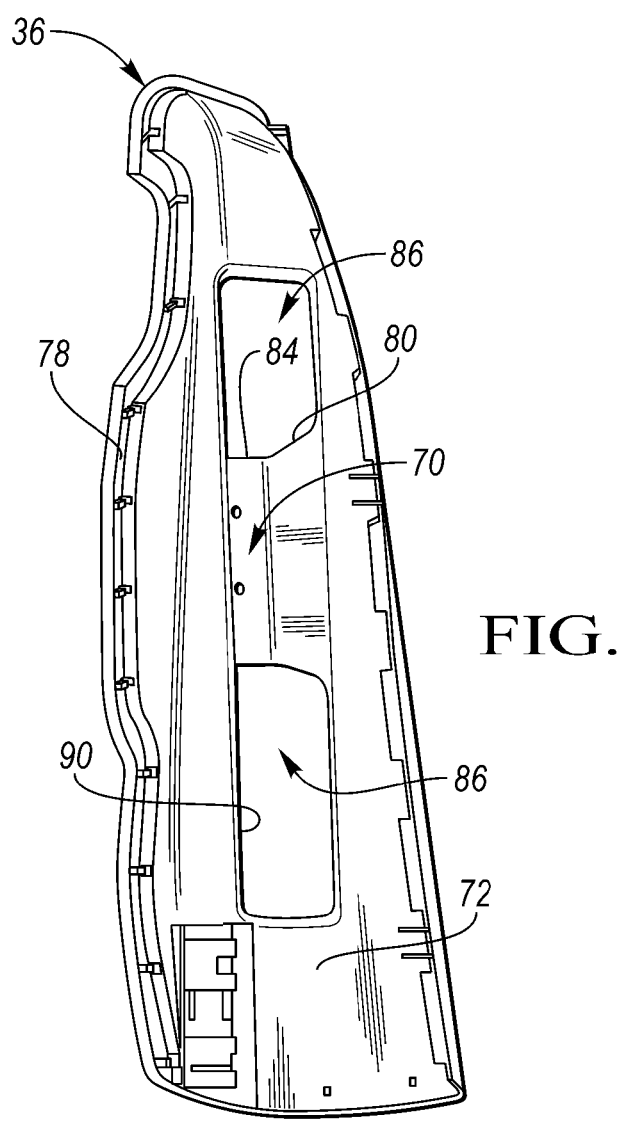
FIG. 3 is a front perspective view of a carrier that may be provided with the side bolster assembly.

Referring to FIGS. 2 and 3, carrier 36 may be a support structure for the side bolster assembly 10 and may facilitate mounting of components to the side bolster assembly 10. The carrier 36 may have any suitable configuration and may be made of any suitable material, such as a polymeric material. The carrier 36 may be fixedly positioned with respect to the vehicle body 14. For instance, the carrier 36 may be directly mounted to the vehicle body 14 or may be indirectly mounted to the vehicle body 14 via a mounting bracket that may extend from the carrier 36. At least a portion of the carrier 36 may be spaced apart from the vehicle body 14 such that a void or hollow space may be provided between the side bolster assembly 10 and the vehicle body 14. In at least one embodiment, the carrier 36 may have a pocket 70 and a plurality of walls, such as a first wall 72, a second wall 74, a step wall 76, and a lateral step wall 78.

The pocket 70 may be configured to receive the airbag module 38. The pocket 70 may extend from the first wall 72 toward the vehicle body 14. The pocket 70 may be at least partially defined by a plurality of pocket walls, such as a first pocket wall 80, a second pocket wall 82, and a third pocket wall 84.

The first pocket wall 80 may extend from the first wall 72. For example, the first pocket wall 80 may extend from the first wall 72 in a direction that extends away from the cushion 32.

The second pocket wall 82 may extend from the first wall 72 and may be disposed opposite the first pocket wall 80. In addition, the second pocket wall 82 may be completely spaced apart from the first pocket wall 80. The second pocket wall 82 may also be disposed closer to the rear seat 16 and seat back 22 than the first pocket wall 80. The second pocket wall 82 may extend from the first wall 72 in a direction that extends away from the cushion 32.

The third pocket wall 84 may extend from the first pocket wall 80 to the second pocket wall 82. For instance, the third pocket wall 84 may be disposed at an end of the first pocket wall 80 and at an end of the second pocket wall 82.

Referring to FIG. 3, the pocket 70 may be open at opposite ends. For instance, one or more side pocket openings 86 may be disposed at opposite ends of the pocket 70 and may be at least partially defined by the first pocket wall 80, the second pocket wall 82, and the third pocket wall 84. In FIG. 3, a pair of side pocket openings 86 are shown. The side pocket openings 86 may allow the airbag module 38 to extend vertically in the carrier 36 while allowing the first pocket wall 80, second pocket wall 82, and the third pocket wall 84 to be provided with a shorter length to reduce the weight of the carrier 36.

Referring again to FIGS. 2 and 3, the first wall 72 may support the cushion 32. In addition, the first wall 72 may define a pocket opening 90 of the pocket 70. As such, the first wall 72 may extend completely around the pocket 70 such that the first wall 72 may define the entire perimeter of the pocket opening 90. The cushion 32 may extend continuously across the pocket opening 90. As such, the cushion 32 may completely cover the pocket opening 90 and the airbag module 38. The first wall 72 may extend from the step wall 76 toward or to the lateral step wall 78. From the perspective shown in FIG. 2, the first wall 72 is disposed on opposite sides of the pocket 70. Moreover, the trim cover 30 may be spaced apart from and may not engage the first wall 72 in one or more embodiments.

The second wall 74 may be offset from the first wall 72. For example, the second wall 74 may be disposed proximate an outboard side of the side bolster assembly 10 and may be disposed forward of the first wall 72, or closer to the trim cover 30 than the first wall 72. In the embodiment shown in FIG. 2, the interior surface 52 of the trim cover 30 may extend along and may engage the second wall 74 such that the cushion 32 may not be disposed between the trim cover 30 and the second wall 74.

The step wall 76 may extend between the first wall 72 and the second wall 74. For instance, the step wall 76 may extend from the first wall 72 to the second wall 74. The step wall 76 may face toward and may be disposed opposite the first cushion end surface 64. As such, the step wall 76 may help position the cushion 32 with respect to the carrier 36. In addition, the guide member 40 may be disposed between or may extend between the step wall 76 and the cushion 32. The step wall 76 may have a height from the first wall 72 to the second wall 74 that may be approximately the same as the thickness of the cushion 32 near the first cushion end surface 64. As such, the first cushion surface 60 may be generally aligned with the surface of the second wall 74 that supports the trim cover 30 to provide a desired appearance.

The lateral step wall 78 may extend between the first wall 72 and the rear seat 16. For example, a lateral step wall 78 may extend from the first wall 72 toward the rear seat 16 or vice versa. In addition, the lateral step wall 78 may be disposed proximate the second cushion end surface 66. As such, the lateral step wall 78 may help position the cushion 32 with respect to the carrier 36. The lateral step wall 78 may be disposed rearward of the step wall 76 or closer to the vehicle body 14 than the step wall 76 and one or more embodiments.

The airbag module 38 may be configured to deploy an airbag to help protect a seat occupant. The airbag module 38 may be received in the carrier 36. For example, the airbag module 38 may be disposed in the pocket between the first pocket wall 80 and the second pocket wall 82. In addition, the airbag module 38 may be supported by the carrier 36. For instance, the airbag module 38 may be mounted to a wall of the carrier 36 that at least partially defines the pocket 70, such as the third pocket wall 84. In at least one embodiment, the airbag module 38 may include a housing 100, an inflator 102, and an airbag 104.

The housing 100 may be configured to receive at least a portion of the airbag 104 when the airbag 104 is deflated or in a stored condition. The housing 100 may have a "soft" configuration or a "hard" configuration. In a soft configuration, the housing 100 may include a flexible cover, band, strap, or wrap that may extend around a deflated airbag 104 to hold or package the airbag 104 prior to deployment. In a hard configuration, the housing 100 may be a rigid container, such as a plastic or metal box, that may receive the deflated airbag 104. In either configuration, the housing 100 may open or separate in response to force exerted by the airbag 104 when the airbag 104 is inflated or deployed. In FIG. 2, the housing 100 is represented by a dashed line.

The inflator 102 may provide an inflation gas to the airbag 104 to inflate the airbag 104 from a stored condition to an inflated condition. The inflator 102 may be fixedly positioned with respect to the carrier 36. For example, the inflator 102 may be mounted to the carrier 36 at or near the third pocket wall 84 so as to not interfere with or impede deployment of the airbag 104. The inflator 102 may be mounted in any suitable manner, such as with an inflator fastener 106 like a stud or bolt. The inflator 102 may be disposed in the pocket 70. Alternatively, the inflator 102 may be disposed outside the pocket 70 and may be fluidly connected to the airbag 104 via a tube.

The airbag 104 may be configured to deploy out of the side bolster assembly 10 when inflated. Moreover, the airbag 104 may be configured to cushion the head, thorax, and/or pelvis of the seat occupant when deployed. The airbag 104 may be configured to expand from a deflated or stored condition to an inflated or deployed condition when inflation gas is provided to the airbag 104. In the stored condition, which is shown in FIG. 2, the airbag 104 may be deflated and may be folded or stored in the side bolster assembly 10 and/or the housing 100. As such, the airbag 104 may be covered or concealed by the trim cover 30 and may not be visible from outside the side bolster assembly 10. In the deployed condition, the airbag 104 may expand and exit the seat back 22. For example, the airbag 104 may exit the side bolster assembly 10 by severing the deployment seam 54. The airbag 104 may be positioned between a seat occupant and an interior vehicle surface when fully inflated.

The guide member 40 may be configured to help direct deployment of the airbag 104. For example, the guide member 40 may direct deployment of the airbag 104 from the pocket to the deployment seam 54. The guide member 40 may guide or direct deployment of the airbag 104 around the cushion 32 such that the airbag 104 does not deploy through the cushion 32 or through an opening in the cushion 32 upon inflation or when the airbag 104 is inflated. As such, the guide member 40 may route the airbag 104 around an end surface of the cushion 32, such as the first cushion end surface 64, before the airbag 104 reaches the deployment seam 54. For instance, the guide member 40 may extend between the cushion 32 and the first wall of the carrier 36 and then between the first cushion end surface 64 and the step wall of the carrier 36.

The guide member 40 may be fixedly coupled to a component of the side bolster assembly 10, such as the carrier 36 and/or the airbag module 38. In addition, the guide member 40 may include one or more panels. For example, the guide member 40 may include a first panel 110 and/or a second panel 112. The first panel 110 and the second panel 112 may be made of any suitable material or materials and may be a film, textile, sheet, or the like. The first panel 110 and the second panel 112 may or may not be separate pieces. For instance, the first panel 110 and the second panel 112 may be provided as a unitary component in which the first panel 110 and the second panel 112 may designate different portions of the guide member 40 that may be generally disposed on opposite sides of the airbag module 38. Alternatively, the first panel 110 and the second panel 112 may be separate components that may be directly fastened to each other, such as by stitching, or may not be directly fastened to each other. For instance, separate first and second panels 110, 112 may be attached to the inflator fastener 106, but may not be stitched to or fixed to each other in one or more embodiments. The first panel 110 and the second panel 112 may be disposed on opposite sides of the airbag module 38. As such, reference to the first panel 110 and the second panel 112 may be used to designate positioning relative to the airbag module 38.

The first panel 110 may be disposed on the outboard side of the airbag module 38 that may be disposed near the vehicle body 14 and opposite the rear seat 16. As such, the first panel 110 may be disposed between the airbag module 38 and the first pocket wall 80. The first panel 110 may extend around the cushion 32 and along the carrier 36. For example, the first panel 110 may extend along and may engage the first pocket wall 80, the first wall 72, the step wall 76, and optionally the interior surface 52 of the trim cover 30. As such, the first panel 110 may help guide deployment of the airbag 104 and may protect the airbag 104 or prevent the airbag 104 from engaging sharp edges of the carrier 36 during deployment. The first panel 110 may have a first end 120 that may be disposed proximate the deployment seam 54. In at least one embodiment, the first end 120 may be attached to the trim cover 30 proximate the deployment seam 54. It is also contemplated that the first end 120 may not be attached to the trim cover 30 in one or more embodiments.

The second panel 112 may be disposed on the inboard side of the airbag module 38 that may be disposed proximate the rear seat 16. As such, the second panel 112 may be disposed between the airbag module 38 and the second pocket wall 82. The second panel 112 may extend around the cushion 32 and primarily extend along the cushion 32. For example, the second panel 112 may extend along and may engage the second pocket wall 82, the cushion shield 34 (if provided), the first cushion end surface 64, and the first cushion surface 60. The second panel 112 may extend along the second cushion surface 62 when a cushion shield 34 is not provided. The second panel 112 may separate the first panel 110 and the cushion 32 such that the first panel 110 may engage the carrier 36 but may not engage the cushion 32. Likewise, the first panel 110 may separate the second panel 112 from the carrier 36 outside of the pocket 70 such that the second panel 112 may engage the cushion 32 but may not engage the first wall 72 or the step wall 76 of the carrier 36. The second panel 112 may have a second end 122 that may be disposed proximate the deployment seam 54. In at least one embodiment, the second end 122 may be attached to the trim cover 30 proximate the deployment seam 54. It is also contemplated that the second end 122 may not be attached to the trim cover 30 in one or more embodiments.

Figure 4:
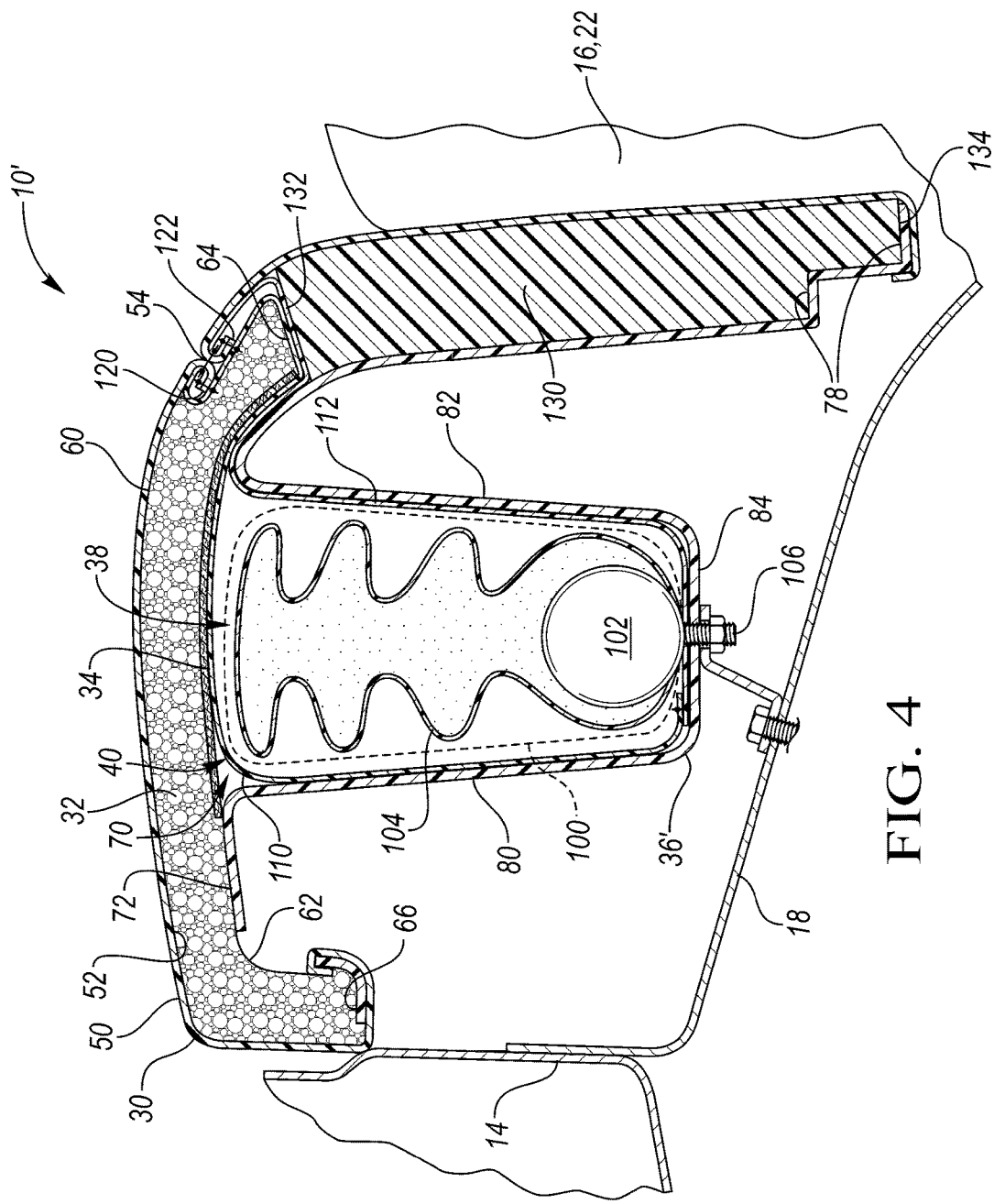
FIG. 4 is a section view of another embodiment of the side bolster assembly.

As shown in FIGS. 3 and 4, the deployment seam 54 may be offset from the pocket 70 or may not be disposed directly opposite the pocket 70 or the third pocket wall 84. In FIG. 2, the deployment seam 54 is offset from the pocket 70 and disposed closer to the side of the vehicle 12 or vehicle body 14 than the rear seat 16. As such, the deployment seam 54 may be disposed opposite the first wall 72 of the carrier 36 and may be positioned between the step wall 76 and the pocket 70. It is also contemplated that the deployment seam could be further outboard or to the left of the step wall 76 from the perspective shown. In FIG. 4, the deployment seam 54 is offset from the pocket 70 and disposed closer to the rear seat 16 than the side of the vehicle 12 or vehicle body 14.

Referring to FIG. 4, another embodiment of a side bolster assembly 10' is shown. The side bolster assembly 10' in FIG. 4 is similar to the side bolster assembly 10 shown in FIG. 2. As such, common reference numbers are used to reference substantially similar components.

In FIG. 4, deployment seam 54 is disposed closer to the rear seat 16 or on an opposite side of the pocket 70 from the configuration shown in FIG. 2. The carrier 36' may be provided without a step wall 76. As such, the cushion 32 may extend along the first wall 72 of the carrier 36' and across the pocket opening 90 toward the rear seat 16, or from left to right from the perspective shown.

An insert panel 130 may be disposed on a portion of the first wall 72 that faces inboard or toward the rear seat 16. The insert panel 130 may be disposed between the trim cover 30 and the first wall 72 of the carrier 36' such that the insert panel 130 may engage the interior surface 52 of the trim cover 30. In addition, the insert panel 130 may include a first insert panel end surface 132 and a second insert panel end surface 134. The first insert panel end surface 132 may be disposed proximate and may engage the guide member 40. The second insert panel end surface 134 may be disposed opposite the first insert panel end surface 132. The second insert panel end surface 134 may engage a lateral step wall 78. The insert panel 130 may be made of a different material than the cushion 32. For instance, the insert panel 130 may be made of a material that may be harder than the cushion 32, like expanded polypropylene foam.

The guide member 40 may extend between the cushion 32 and the insert panel 130. The first panel 110 of the guide member 40 may again be disposed on the outboard side of the airbag module 38 that may be disposed near the vehicle body 14 and opposite the rear seat 16. The second panel 112 of the guide member 40 may again be disposed on the inboard side of the airbag module 38 that may be disposed between the airbag module 38 and the rear seat 16.

The first panel 110 and the second panel 112 may extend around the cushion 32. For example, the first panel 110 may extend along and may engage the first pocket wall 80, the cushion shield 34 (if provided), the first cushion end surface 64, and the first cushion surface 60. The first panel may engage the second cushion surface 62 if the cushion shield 34 is not provided. The second panel 112 may extend along and may engage the second pocket wall 82, the first wall 72, the first insert panel end surface 132, and optionally the interior surface 52 of the trim cover 30. As such, the second panel 112 may help protect the airbag 104 from engaging sharp edges of the carrier 36 during deployment. The first and second ends 120, 122, of the first and second panels 110, 112, respectively, may be disposed proximate the deployment seam 54 as previously discussed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A side bolster assembly comprising:
a carrier having a first wall, a pocket that extends from the first wall, a second wall, and a step wall that extends from the first wall to the second wall;
a cushion that is supported by the first wall and extends across the pocket, wherein the cushion has a first cushion end surface that is disposed proximate the step wall;
an airbag module that is supported by the carrier and disposed in the pocket, the airbag module having an inflatable airbag;
a trim cover that covers at least a portion of the cushion, the trim cover having a deployment seam disposed opposite the first wall between the step wall and the pocket; and
a guide member for guiding the airbag around the cushion upon inflation, wherein the guide member extends from the airbag module toward the deployment seam such that the guide member is disposed between the first wall and the cushion.

2. The side bolster assembly of claim 1 wherein the first wall defines a pocket opening of the pocket and the cushion extends continuously across the pocket opening.

3. The side bolster assembly of claim 1 wherein the guide member extends between the cushion and the first wall and between the first cushion end surface and the step wall.

4. The side bolster assembly of claim 1 further comprising a cushion shield that extends across the pocket, wherein the guide member is disposed between the cushion shield and the first wall.

5. The side bolster assembly of claim 4 wherein the cushion has a second cushion end surface disposed opposite the first cushion end surface, wherein the cushion shield extends from the first cushion end surface across the pocket toward the second cushion end surface.

6. The side bolster assembly claim 1 wherein the guide member has a first panel and a second panel, wherein the first panel has a first end that is attached to the trim cover proximate the deployment seam and the second panel has a second end that is attached to the trim cover proximate the deployment seam, wherein the first panel engages the carrier but does not engage the cushion and the second panel engages the cushion.

7. The side bolster assembly of claim 1 wherein the trim cover is secured to the carrier.

8. The side bolster assembly of claim 1 wherein the carrier is fixedly disposed on the vehicle body.

9. The side bolster assembly of claim 8 wherein the carrier is positionable between the vehicle body and the airbag module when the side bolster assembly is mounted in the vehicle.

10. A side bolster assembly comprising:
- a carrier having a first wall, a pocket that extends from the first wall, a second wall, and a step wall that extends from the first wall to the second wall;
- a cushion that is supported by the first wall and extends across the pocket, wherein the cushion is spaced apart from and does not engage the second wall and has a first cushion end surface that is disposed proximate the step wall;
- an airbag module that is supported by the carrier and disposed in the pocket, the airbag module having an inflatable airbag;
- a trim cover that covers at least a portion of the cushion, wherein the trim cover has a deployment seam and engages the second wall; and
- a guide member for guiding the airbag around the cushion upon inflation, wherein the guide member extends from the airbag module toward the deployment seam such that the guide member is disposed between the first wall and the cushion.

11. A side bolster assembly for mounting in a vehicle proximate a vehicle body, the side bolster assembly comprising:
- a carrier having a pocket having a pocket opening and a first wall that defines the pocket opening, the pocket being at least partially defined by first and second pocket walls that extend from the first wall, wherein the carrier is configured to be fixedly positioned with respect to the vehicle body;
- a cushion that is supported by the first wall and extends across the pocket opening;
- an airbag module that is supported by the carrier and disposed in the pocket between the first pocket wall and the second pocket wall, the airbag module having an inflatable airbag;
- a trim cover that covers at least a portion of the cushion, the trim cover having a deployment seam; and
- a guide member for guiding the airbag around the cushion such that the airbag does not deploy through the cushion upon inflation, the guide member extending between the airbag module and the deployment seam such that the guide member is disposed between the first wall and the cushion.

12. The side bolster assembly of claim 11 wherein the carrier further comprises a third pocket wall that extends from the first pocket wall to the second pocket wall.

13. The side bolster assembly of claim 12 wherein the airbag module includes an inflator that provides an inflation gas to inflate the airbag, wherein the inflator is disposed on the third pocket wall.

14. The side bolster assembly of claim 12 wherein the pocket includes a pair of side pocket openings that are disposed at opposite ends of the pocket and are defined by the first pocket wall, second pocket wall, and third pocket wall.

15. The side bolster assembly of claim 11 further comprising an insert panel that is disposed on the first wall adjacent to a seat back, wherein the guide member extends between a first cushion end surface of the cushion and the insert panel.

16. The side bolster assembly of claim 15 wherein the carrier further comprises a second wall and a lateral step wall that extends from the first wall to the second wall, wherein the insert panel has a first insert panel end surface and engages the guide member and a second insert panel end surface that is disposed opposite the first insert panel end surface and engages the lateral step wall.

17. The side bolster assembly of claim 16 wherein the guide member has a first panel and a second panel, wherein the first panel has a first end that is attached to the trim cover proximate the deployment seam and the second panel has a second end that is attached to the trim cover proximate the deployment seam, wherein the first panel engages the cushion but does not engage the carrier or the insert panel and the second panel engages the carrier and the insert panel but does not engage the cushion.

18. The side bolster assembly of claim 17 wherein the first panel engages the first cushion end surface of the cushion and the second panel engages the first insert panel end surface.

19. The side bolster assembly of claim 11 further comprising an insert panel that extends from the first wall to the trim cover, wherein the guide member extends between a first cushion end surface of the cushion and the insert panel.

20. The side bolster assembly of claim 19 wherein the deployment seam is disposed opposite the first wall between the insert panel and the pocket.

* * * * *